US009566928B2

(12) United States Patent
Forth et al.

(10) Patent No.: US 9,566,928 B2
(45) Date of Patent: Feb. 14, 2017

(54) INTERIOR TRIM GAP COVERING APPARATUSES FOR MOTOR VEHICLES AND METHODS FOR MAKING THE SAME

(71) Applicant: Faurecia Interior Systems, Inc., Auburn Hills, MI (US)

(72) Inventors: Gary Forth, Washington, MI (US); Frank Gianferrara, Armada, MI (US); Roger Reuter, Waterford, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 0 days.

(21) Appl. No.: 14/729,638

(22) Filed: Jun. 3, 2015

(65) Prior Publication Data

US 2016/0355145 A1    Dec. 8, 2016

(51) Int. Cl.
*B60R 21/05*    (2006.01)
*B60R 13/02*    (2006.01)

(52) U.S. Cl.
CPC .............. *B60R 21/05* (2013.01); *B60R 13/02* (2013.01); *B60R 13/0256* (2013.01); *B60R 2013/0293* (2013.01)

(58) Field of Classification Search
CPC ...... B60R 13/02; B60R 13/0256; B60R 21/05; B62D 1/16; B62D 1/18; B62D 1/185; B62D 1/187; B62D 1/189; B62D 25/14
USPC ........................... 296/1.08, 70; 280/775, 779
See application file for complete search history.

(56) References Cited

U.S. PATENT DOCUMENTS

| | | | |
|---|---|---|---|
| 5,813,288 A | * | 9/1998 | Simonetti ................ B62D 1/16 180/90 |
| 7,077,431 B2 | | 7/2006 | Gayer et al. |
| 7,150,488 B2 | | 12/2006 | Kornylo et al. |
| 2009/0033083 A1 | * | 2/2009 | Kobayashi ............ B60K 37/00 280/779 |
| 2015/0283926 A1 | * | 10/2015 | Hamdoon ............ B60N 2/4235 297/411.21 |

FOREIGN PATENT DOCUMENTS

| | | | |
|---|---|---|---|
| DE | 4337721 C1 | 2/1995 | |
| DE | 19644170 A1 | * 4/1998 | ............ B60R 13/02 |
| DE | 102008054359 A1 | 5/2010 | |
| DE | 102012023944 A1 | 6/2014 | |
| EP | 2567803 A2 | 3/2013 | |
| FR | WO 2013072607 A1 | * 5/2013 | ............ B62D 1/187 |

(Continued)

OTHER PUBLICATIONS

English translation of DE 196 44 170; retreived Jun. 11, 2016 from PatentTranslate located www.epo.org.*

(Continued)

*Primary Examiner* — Jason S Daniels
(74) *Attorney, Agent, or Firm* — Lorenz & Kopf LLP

(57) ABSTRACT

Interior trim gap covering apparatuses for motor vehicles and methods for making interior trim gap covering apparatuses are provided. In one example, an interior trim gap covering apparatus comprises a first gap hider member. The first gap hider member comprises a substrate having a forward edge and a rearward edge and a plurality of openings formed therethrough extending between the forward and rearward edges to facilitate the substrate deforming in response to an applied force. A flexible covering overlies the substrate.

15 Claims, 4 Drawing Sheets

(56) References Cited

FOREIGN PATENT DOCUMENTS

| | | |
|---|---|---|
| JP | S60226357 A | 11/1985 |
| JP | S6325679 U | 2/1988 |
| JP | 2008254480 A | 10/2008 |
| JP | 2010047215 A | 3/2010 |
| JP | 2011235707 A | 11/2011 |
| KR | 20140042491 A | 4/2014 |

OTHER PUBLICATIONS

European Patent Office, Extended European Search Report for Application No. 16172239.2—1755 mailed Oct. 19, 2016.

* cited by examiner

INTERIOR TRIM GAP COVERING APPARATUSES FOR MOTOR VEHICLES AND METHODS FOR MAKING THE SAME

TECHNICAL FIELD

The present disclosure relates generally to interior trim for motor vehicles, and more particularly to interior trim gap covering apparatuses for motor vehicles to cover a gap, for example, that exposes a steering column or the like, and methods for making such interior trim gap covering apparatuses.

BACKGROUND

Motor vehicles typically include an instrument panel and a steering column that extends through an opening in the instrument panel. Generally, this opening must be large enough to provide for the full tilt of the steering wheel, which leaves a gap between the edge of the instrument panel opening and the steering column. As a result, there is a need to shield the opening around the steering column for both aesthetics and to prevent access to the instrument panel. A closeout, or boot, generally surrounds the steering column for preventing such access to the instrument panel while still allowing for full travel and tilt of the steering wheel. An additional requirement is that the steering column be able to translate a specified axial distance upon impact by the occupant, such as in a frontal impact.

Current closeouts employed between an adjustable steering column and an instrument panel are generally either a flexible type gap covering, such as disclosed in U.S. Pat. No. 7,077,431 issued to Geyer, or a rigid plastic-type gap covering. In general, the flexible type gap coverings use an unsupported skin material that can unfortunately crease and permanently wrinkle from moving and positioning for full travel and tilt of the steering wheel. Additionally, the rigid plastic-type gap coverings can undesirably break apart when the steering column moves in an axial direction, such as in a frontal impact.

Accordingly, it is desirable to provide interior trim gap coverings for motor vehicles that avoid creasing and/or wrinkling, for example, from moving and positioning for full travel and tilt of a steering wheel, and methods for making such interior trim gap coverings. Moreover, it is desirable to provide interior trim gap covering for motor vehicles that allow a steering column to translate a specified axial distance, such as during a frontal impact, without the interior trim gap covering breaking apart, and methods for making such interior trim gap coverings. Furthermore, other desirable features and characteristics of the present disclosure will become apparent from the subsequent detailed description and the appended claims, taken in conjunction with the accompanying drawings and this background.

BRIEF SUMMARY

Interior trim gap covering apparatuses for motor vehicles and methods for making interior trim gap covering apparatuses are provided are provided herein. In an exemplary embodiment, an interior trim gap covering apparatus for a motor vehicle comprises a first gap hider member. The first gap hider member comprises a substrate having a forward edge and a rearward edge and a plurality of openings formed therethrough extending between the forward and rearward edges to facilitate the substrate deforming in response to an applied force. A flexible covering overlies the substrate.

In an exemplary embodiment, a method of making an interior trim gap covering apparatus for a motor vehicle is provided. The method comprises the steps of forming a plurality of openings through a substrate extending between a forward edge and a rearward edge of the substrate. The openings are configured to facilitate the substrate deforming in response to an applied force. The substrate is covered with a flexible covering to form a gap hider member.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the disclosure or the application and uses of the disclosure. Furthermore, there is no intention to be bound by any theory presented in the preceding background or the following detailed description.

Various embodiments contemplated herein relate to interior trim gap covering apparatuses and methods for making interior trim gap covering apparatuses for motor vehicles. The exemplary embodiments taught herein provide an interior trim gap covering apparatus for covering a gap that exposes, for example, a portion of a steering column and/or an instrument panel of a motor vehicle. The interior trim gap covering apparatus comprises a first gap hider member. The first gap hider member comprises a substrate with a forward edge and a rearward edge. A plurality of openings is formed through the substrate extending between the forward and rearward edges. In an exemplary embodiment, advantageously the openings allow or otherwise facilitate the substrate deforming, e.g., elastically deforming and/or plastically deforming, in response to an applied force, such as when the steering column translates generally towards the instrument panel a specified axial distance upon impact by an occupant (e.g., during a frontal impact). A flexible covering overlies the substrate. In an exemplary embodiment, advantageously the flexible covering is supported by the substrate to avoid creasing and/or wrinkling, for example, from moving and positioning for full travel and tilt of a steering wheel that is operatively coupled to the steering column. In an exemplary embodiment, advantageously the flexible covering covers the openings in the substrate to help further hide the gap that may otherwise be visible through the openings, and additionally, is sufficiently flexible to move with the substrate when the substrate deforms without breaking in response to the applied force.

Figure 1:
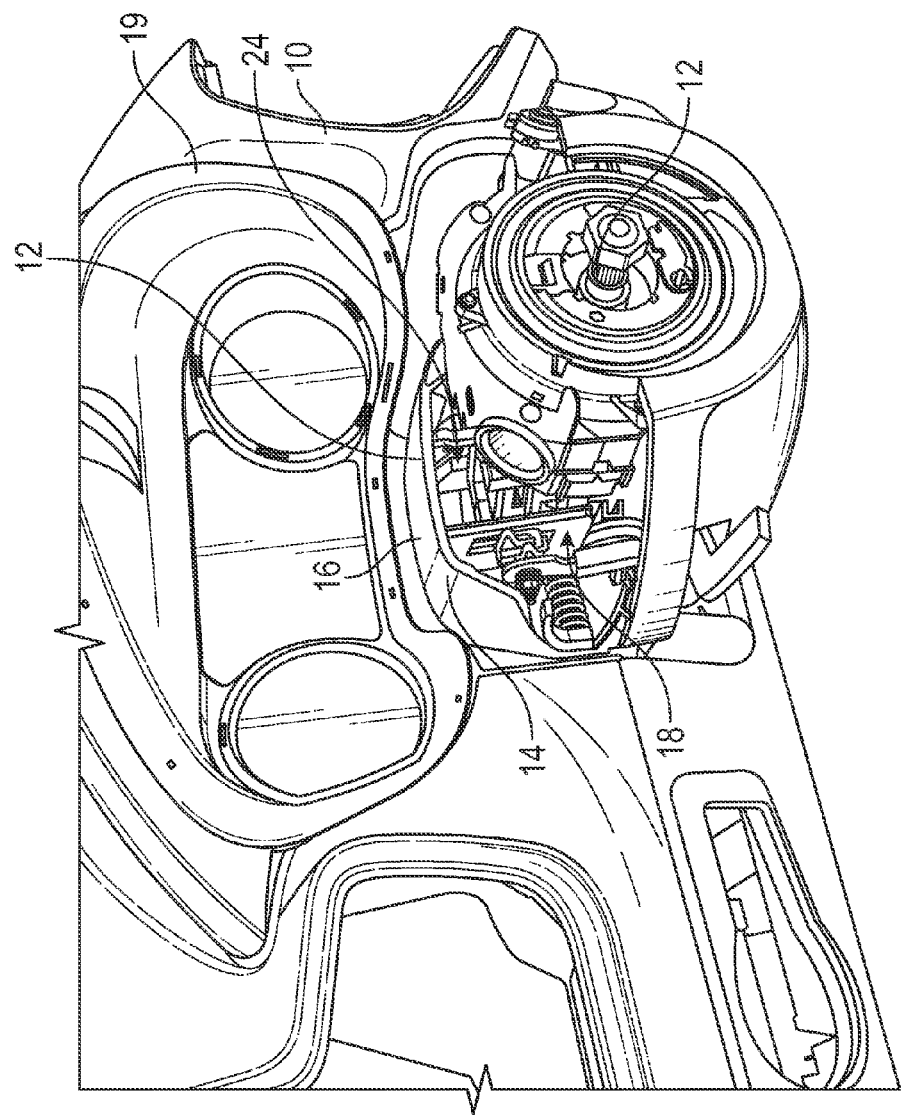
FIG. 1 is a perspective view of an instrument panel, a steering column, and an inner member of an interior trim gap covering apparatus for a motor vehicle in accordance with an exemplary embodiment.
Figure 2:
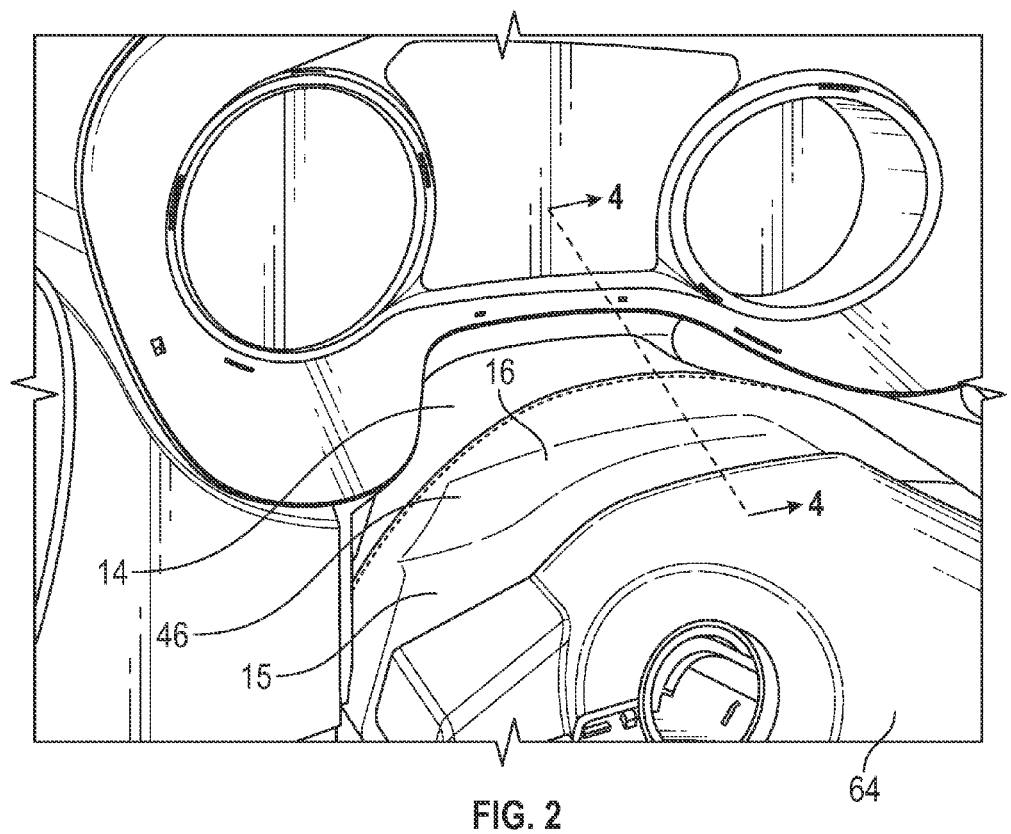
FIG. 2 is a perspective view of an instrument panel and an interior trim gap covering apparatus for a motor vehicle in accordance with an exemplary embodiment.
Figure 4:
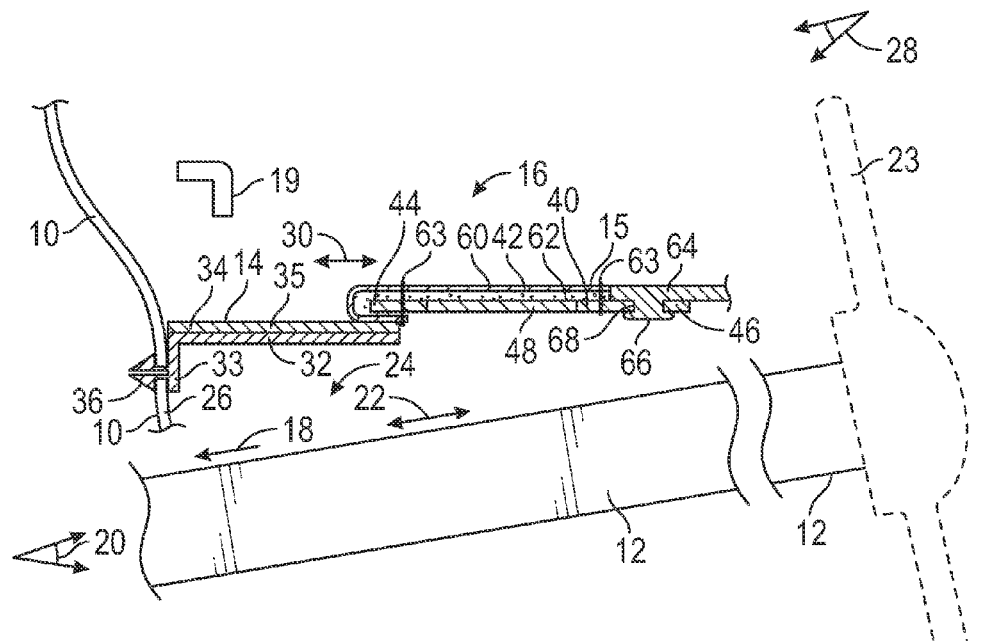
FIG. 4 is a sectional side view of the instrument panel, the steering column, and the interior trim gap covering apparatus depicted in FIG. 2 along line 4-4 in accordance with an exemplary embodiment.

FIG. 1 is a perspective view of an instrument panel 10, a steering column 12, and an inner gap hider member 14 of an interior trim gap covering apparatus 16 for a motor vehicle in accordance with an exemplary embodiment. FIG. 2 is a perspective view of the instrument panel 10 and the interior trim gap covering apparatus 16 including the inner gap hider member 14 and an outer gap hider member 15, and FIG. 4 is a sectional side view of the instrument panel 10 and the interior trim gap covering apparatus 16 depicted in FIG. 2 along line 4-4 in accordance with an exemplary embodiment. As illustrated in FIGS. 1 and 4, the instrument panel 10 has a cavity 18 below a cluster bezel 19 through which the steering column 12 extends for coupling to a structure (not shown) under the instrument panel 10. The cavity 18 is sized to allow for tilt (indicated by arrows 20) and full travel along an axial direction (indicated by double headed arrow 22) of a steering wheel 23 (shown in dashed lines) that is operatively coupled to the steering column 12 as well as for unimpeded translational movement of the steering column 12 along the axial direction 22 for a specified axial distance during a vehicle collision. Between the steering column 12 and the instrument panel 10 is a gap 24 that exposes the steering column 12 and a lower opening portion 26 of the instrument panel 10.

Referring to FIGS. 2 and 4, in an exemplary embodiment, the inner and outer gap hider members 14 and 15 are positioned adjacent to each other in which the outer gap hider member partially overlaps the inner gap hider member 14 to cover or otherwise obstruct a vehicle occupant's view 28 of the gap 24. In an exemplary embodiment, the inner and outer gap hider members are free to move (e.g., translate) relative to one another generally along an axis 30 that may be parallel or at a slight angle (e.g., about 30° or less) relative to the axial direction 22 to advantageously cover the gap 24 while allowing for full travel and tilt of the steering wheel 23.

In an exemplary embodiment, the inner gap hider member 14 comprises a rigid substrate 32 and an outer covering 34 that overlies the rigid substrate 32. The rigid substrate 32 may be formed, for example, via injection molding of a polymeric material such as polypropylene (PP), polycarbonate (PC), ABS, styrene maleic anhydride (SMA), polyamide (PA), polyester (PE), or the like. Additionally, the polymeric material may be unfilled, filled, or compounded to help provide sufficient structure for rigidly supporting the outer covering 34. Other polymeric materials for molding plastic substrates known to those skilled in the art may also be used. The outer covering 34 may be a coating, such as a decorative paint, a skin material such as a polyvinyl chloride (PVC)/vinyl skin, a thermoplastic olefin (TPO) skin, a polyurethane (PU or TPU) skin, or the like and/or a laminate structure such as a foam layer with an overlying skin material to provide an aesthetical outer surface. In an exemplary embodiment, the inner gap hider member 14 is attached or otherwise operatively coupled to the instrument panel 10 over the lower opening portion 26, for example, via a molded-in feature 36 or the like that extends from a generally vertical leg portion 33 of the inner gap hider member 14. As illustrated, the inner gap hider member 14 advantageously has an "L" cross-sectional shape in which a generally horizontal leg portion 35 extends from the generally vertical leg portion 33 towards the steering wheel 23 to partially cover the gap 24.

Figure 3:
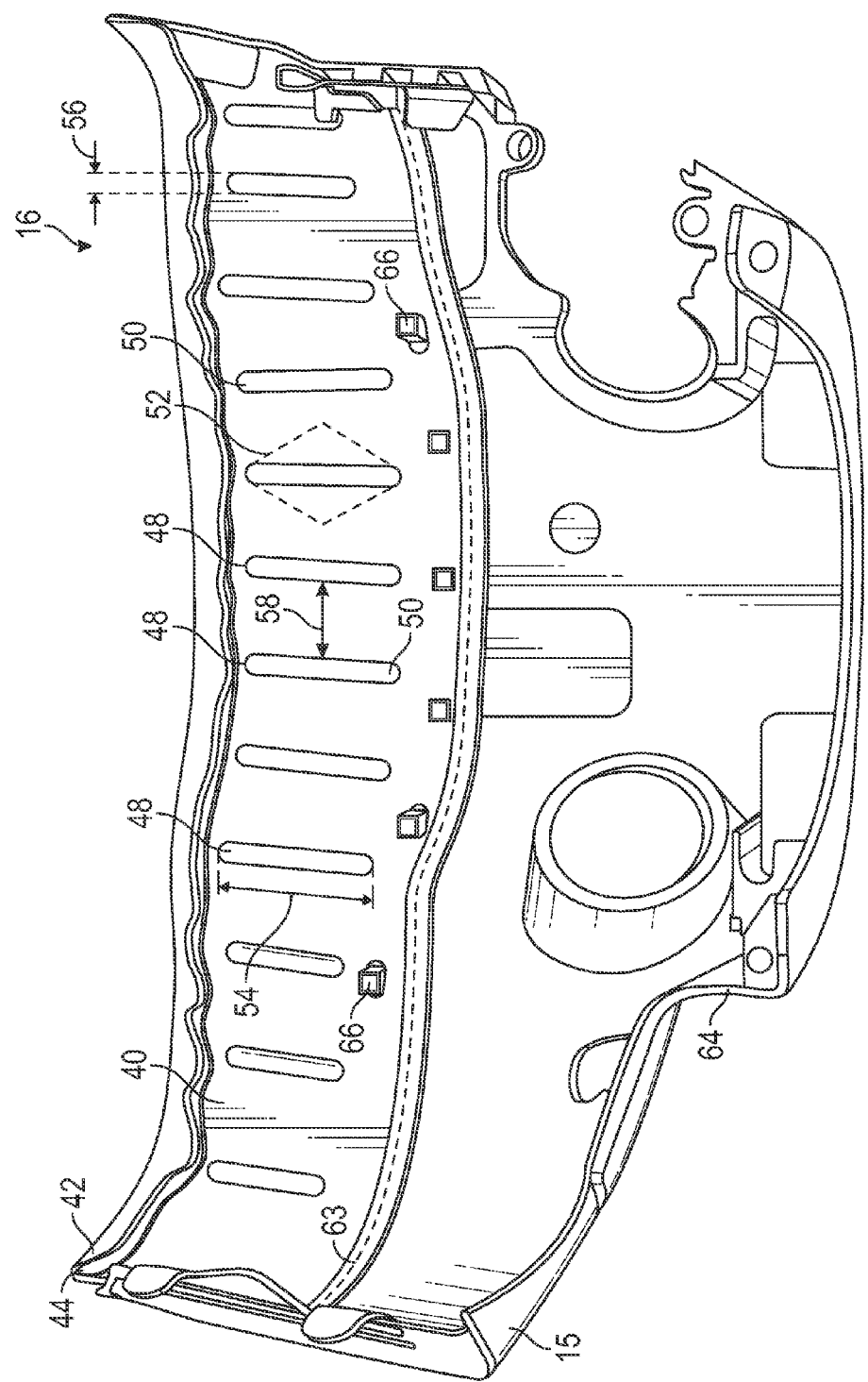
FIG. 3 is a rear perspective view of an outer member of an interior trim gap covering apparatus for a motor vehicle in accordance with an exemplary embodiment.

FIG. 3 is a rear perspective view of the outer gap hider member 15 of the interior trim gap covering apparatus 16 in accordance with an exemplary embodiment. Referring to FIGS. 2-4, the outer gap hider member 15 comprises a substrate 40 and a flexible covering 42 that overlies the substrate 40. The substrate 40 has a forward edge 44 and a rearward edge 46 and may, for example, have an arcuate panel-like shape for radially positioning around the steering column 12.

Formed through the substrate 40 are openings 48 that extend between the forward and rearward edges 44 and 46. As will be discussed in further detail below, the openings 48 facilitate the substrate 40 deforming in response to an applied force. In an exemplary embodiment, the openings 48 are configured as elongated openings such as slots 50, or may have an alternative shape, such as, for example, a diamond-shaped opening 52 (indicated by dashed line) to advantageously facilitate the substrate 40 deforming. In an exemplary embodiment, the openings 48 have a length (indicated by double headed arrow 54) of from about 10 to about 50 mm and a width (indicated by arrows 56) of from about 5 to about 12 mm to advantageously facilitate the substrate 40 deforming. In an exemplary embodiment, the openings 48 are arranged as a plurality of juxtaposed elongated openings that are spaced apart from each other a distance (indicated by double headed arrow 58) of from about 10 to about 30 mm to advantageously facilitate the substrate 40 deforming.

In an exemplary embodiment, the substrate 40 is formed of a semi-rigid polymeric material such as polypropylene (PP) that allows for some elastic and/or plastic deformation without breaking. The semi-rigid polymeric material may be formed into a sheet having a thickness of from about 0.75 to about 2.5 mm and subsequently die cut, for example, to form the openings 48 through the substrate 40.

In an exemplary embodiment, the flexible covering 42 comprises an outer skin 60. The outer skin 60 may be formed from a PVC/vinyl skin, a TPO skin, a polyurethane PU or TPU skin, or the like. In an exemplary embodiment, the flexible covering 42 may further comprise a foam layer 62 that is disposed under the outer skin 60. The foam layer 62 may be integrally formed with the outer skin 60 such as via a co-extrusion process to form a bi-laminate or multi-laminate structure, or alternatively, may be a separate layer from the outer skin 60. In an exemplary embodiment, the flexible covering 42 is sown (via stitching 63) or otherwise attached to the substrate 40 proximate the forward and rearward edges 44 and 46.

As illustrated, the outer gap hider member 15 further includes a steering wheel shroud 64 that is coupled to the substrate 40 and that is operatively couple to a steering column 12. In an exemplary embodiment, the steering wheel shroud 64 has molded posts 66 (e.g., which may be configured as heat stakes if desired) that extend through openings 68 in the substrate 40 to couple the steering wheel shroud 64 to the substrate 40. The steering wheel shroud 64 may be molded using a polymeric material such as PP, PC, ABS, PA, PE, or the like and decorated using, for example, a molded-in color and/or pigment or a decorative paint.

Figure 5:
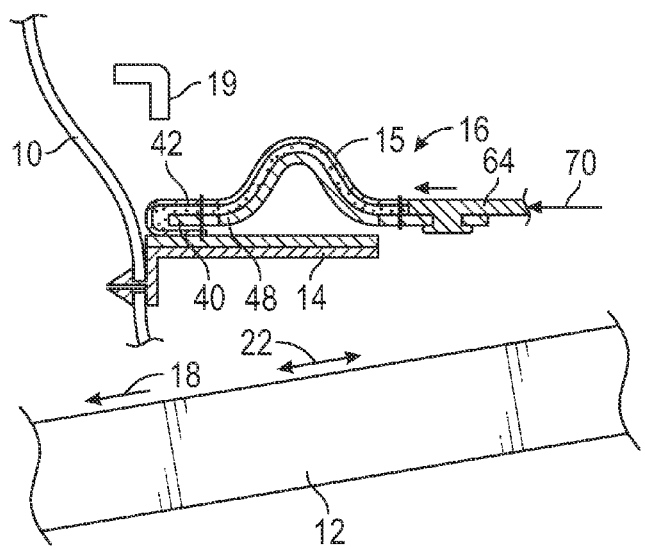
FIG. 5 is a sectional side view of the instrument panel, the steering column, and the interior trim gap covering apparatus depicted in FIG. 2 along line 4-4 in accordance with another exemplary embodiment.

FIG. 5 is a sectional side view of the instrument panel 10 and the interior trim gap covering apparatus 16 similar to the depiction in FIG. 4 but illustrating the interior trim gap covering apparatus 16 deforming in response to an applied force (indicated by arrow 70). As illustrated in FIG. 5, the substrate 40 elastically and/or plastically deforms in response to the applied force 70, such as when the steering column 12 translates generally towards the instrument panel 10 a specified axial distance during a frontal impact, for example. In an exemplary embodiment, the openings 48 locally weaken a center section of the substrate 40 so that when the applied force 70 is translated, for example, through the steering wheel shroud 64 to the substrate 40, the area(s) of the substrate 40 surrounding the openings 48 can bend and/or otherwise deform to help reduce stresses from concentrating in various areas of the substrate 40 and/or other areas of the outer gap hider member 15 to help prevent breakage of the outer gap hider member 15 and/or to allow the steering column 12 to collapse beyond its travel position without restriction from a rigid trim component(s). As illustrated, the flexible covering 42 is sufficiently flexible to move and flex with corresponding movement and deformation of the substrate 40.

Figure 6:
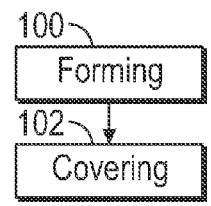
FIG. 6 is a flowchart of a method of forming an interior trim gap covering apparatus for a motor vehicle in accordance with an exemplary embodiment.

Referring to FIG. 6, a method of forming an interior trim gap covering apparatus for a motor vehicle is provided. The method comprises the steps of forming (step 100) a plurality of openings through a substrate extending between a forward edge and a rearward edge of the substrate. The openings are configured to facilitate the substrate deforming in response to an applied force. The substrate is covered (step 102) with a flexible covering to form a gap hider member.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An interior trim gap covering apparatus for a motor vehicle, the apparatus comprising:
   a first gap hider member comprising:
      a substrate deformable from a normal state to a deformed state along a deformation axis between a forward edge and a rearward edge of the substrate, the substrate having a plurality of elongated openings formed therethrough extending between the forward and rearward edges along the deformation axis to facilitate the substrate deforming from the normal state to the deformed state in response to an applied force along the deformation axis; and
      a flexible covering overlying the substrate.

2. The apparatus of claim 1, wherein the elongated openings are configured as diamond-shaped openings.

3. The apparatus of claim 1, wherein the elongated openings are configured as slots.

4. The apparatus of claim 1, wherein the elongated openings are configured as a plurality of juxtaposed elongated openings.

5. The apparatus of claim 1, wherein the flexible covering comprises an outer skin.

6. The apparatus of claim 5, wherein the flexible covering further comprises a foam layer that is disposed between the outer skin and the substrate.

7. The apparatus of claim 1, wherein the first gap hider member further comprises:
   a steering wheel shroud that is coupled to the substrate and that is configured to operatively couple to a steering column.

8. The apparatus of claim 1, further comprising a second gap hider member that is configured for positioning adjacent to the first gap hider member and to move relative to the first gap hider member generally along the deformation axis to cooperatively cover a gap.

9. The apparatus of claim 8, wherein the second gap hider member is configured to operatively couple to an instrument panel and the first gap hider member is configured to operatively couple to a steering column, and wherein the first and second gap hider members are cooperatively configured to cover the gap that exposes a portion of the steering column and/or the instrument panel.

10. The apparatus of claim 8, wherein the second gap hider member comprises;
    a rigid substrate; and
    an outer covering overlying the rigid substrate.

11. The apparatus of claim 1, wherein the elongated openings each have a length of from about 10 to about 50 mm.

12. The apparatus of claim 1, wherein the elongated openings each have a width of from about 5 to about 12 mm.

13. The apparatus of claim 1, wherein the elongated openings are spaced apart from each other a distance of from about 10 to about 30 mm.

14. The apparatus of claim 1, wherein the substrate has a thickness of from about 0.75 to about 2.5 mm.

15. A method of forming an interior trim gap covering apparatus for a motor vehicle, the method comprising the steps of:
   forming a plurality of elongated openings through a substrate extending between a forward edge and a rearward edge of the substrate along a deformation axis between the forward edge and the rearward edge of the substrate, wherein the openings are configured to facilitate the substrate deforming from a normal state to a deformed state along the deformation axis in response to an applied force along the deformation axis; and
   covering the substrate with a flexible covering to form a gap hider member.

* * * * *